(12) United States Patent
Kuehnle et al.

(10) Patent No.: US 8,391,556 B2
(45) Date of Patent: Mar. 5, 2013

(54) METHOD AND SYSTEM FOR VIDEO-BASED ROAD LANE CURVATURE MEASUREMENT

(75) Inventors: Andreas Kuehnle, Villa Park, CA (US); Cathy Boon, Orange, CA (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 765 days.

(21) Appl. No.: 12/523,503

(22) PCT Filed: Jan. 23, 2008

(86) PCT No.: PCT/EP2008/000484
§ 371 (c)(1), (2), (4) Date: Oct. 6, 2009

(87) PCT Pub. No.: WO2008/089964
PCT Pub. Date: Jul. 31, 2008

(65) Prior Publication Data
US 2010/0104139 A1    Apr. 29, 2010

Related U.S. Application Data

(60) Provisional application No. 60/897,082, filed on Jan. 23, 2007, provisional application No. 60/897,225, filed on Jan. 23, 2007, provisional application No. 60/897,219, filed on Jan. 23, 2007, provisional application No. 60/897,220, filed on Jan. 23, 2007.

(51) Int. Cl.
*G06K 9/00*    (2006.01)

(52) U.S. Cl. ............................................ 382/104
(58) Field of Classification Search .............. 382/104, 382/103, 168, 272
See application file for complete search history.

(56) References Cited

U.S. PATENT DOCUMENTS

| | | | |
|---|---|---|---|
| 5,675,489 A | 10/1997 | Pomerleau | |
| 5,991,427 A | 11/1999 | Kakinami et al. | |
| 6,850,629 B2 * | 2/2005 | Jeon | 382/104 |
| 2002/0031242 A1 * | 3/2002 | Yasui et al. | 382/104 |
| 2002/0081000 A1 | 6/2002 | Ham | |

FOREIGN PATENT DOCUMENTS

| | | |
|---|---|---|
| EP | 0740163 A2 | 10/1996 |
| WO | 2005/119594 A2 | 12/2005 |

* cited by examiner

*Primary Examiner* — Claire X Wang
(74) *Attorney, Agent, or Firm* — Rothwell, Figg, Ernst & Manbeck, P.C.

(57) ABSTRACT

A method and system for video-based road lane curvature measurement is provided. An image processing system receives roadway scene images from a vehicle-mounted video camera to measure road curvature. Road boundary indicators, such as lane markings, are used for identifying the road boundaries. The road curvature is approximated using a relation between the slope of a line connecting two points on a lane marking, and the average longitudinal distance from the camera to the line.

25 Claims, 13 Drawing Sheets

300

250

METHOD AND SYSTEM FOR VIDEO-BASED ROAD LANE CURVATURE MEASUREMENT

CROSS REFERENCE TO RELATED APPLICATIONS

This application is a 35 U.S.C. §371 National Phase Entry Application from PCT/EP2008/000484, filed Jan. 23, 2008, and designating the United States, which claims priority under 35 U.S.C. 119(e) from U.S. Provisional Patent Application Ser. No. 60/897,082, filed Jan. 23, 2007, incorporated herein by reference. This application further claims priority under 35 U.S.C. 19(e) from U.S. Provisional Patent Application Ser. No. 60/897,225, filed Jan. 23, 2007, incorporated herein by reference. This application further claims priority under 35 U.S.C. 119(e) from U.S. Provisional Patent Application Ser. No. 60/897,219, filed Jan. 23, 2007, incorporated herein by reference. This application further claims priority under 35 U.S.C. 119(e) from U.S. Provisional Patent Application Ser. No. 60/897,220, filed Jan. 23, 2007, incorporated herein by reference.

FIELD OF THE INVENTION

The present invention relates to image processing of roadway scenes, and in particular to image processing of roadway scenes for use in vehicles.

BACKGROUND OF THE INVENTION

Road curvature measurement is typically performed by specialized surveying systems. Such systems combine a local curvature measurement (coming from a yaw rate sensor or vehicle wheel speed sensors) with global positioning satellite (GPS) location signals, and assign curvature to various positions as the vehicle passes over an area of interest. There is no look-ahead functionality associated with such systems—the curvature measured is that at the vehicle position.

Classical image processing based approaches to curvature measurement use the Hough transform, least-squares parabolic fitting, or least-squares circle fitting to determine the curvature, passing a polynomial through three or more points that are deemed to define the road. However, such methods require at least three measurement points to function, which are not always available.

U.S. Pat. No. 5,675,489 provides a method that receives an image of the road ahead and uses a search procedure, straightening out the image to a perspective-free (map-like) image of road lane markings, to determine the road curvature. Not only is a search procedure required for this, but the method relies on computationally intensive interpolation between pixel gray levels for fractional shifting.

BRIEF SUMMARY OF THE INVENTION

The present invention provides a method and system for video-based road lane curvature measurement. One embodiment involves image processing of roadway scenes for use in vehicles, with optical metrology for road curvature measurement. In one implementation, an image processing system receives roadway scene images from a vehicle-mounted video camera to measure road curvature. Road boundary indicators such as lane markings may be used for identifying the road boundaries. In one example, the road curvature is approximated using a relation between: the slope of a connecting line (chord) between two points on a lane marking, and the average distance from the camera to the connecting line. Only two points are required, though more may be used, to generate the connecting line, determine the slope of the connecting line, and then derive the road curvature therefrom.

The obtained curvature value may be filtered with a speed-dependent mechanism, reducing measurement noise, but retaining local detail at different driving speeds. The yaw angle of the camera viewing the road is also accounted for.

These and other features, aspects and advantages of the present invention will become understood with reference to the following description, appended claims and accompanying figures.

These and other features, aspects and advantages of the invention will become understood with reference to the following description, appended claims and accompanying figures.

DETAILED DESCRIPTION OF THE INVENTION

The present invention provides a method and system for video-based road lane curvature measurement. In one implementation, an image processing system receives roadway scene images from a vehicle-mounted video camera to measure road curvature. Road boundary indicators, such as lane markings, are used for identifying the road boundaries. In one example, the road curvature is approximated using a relation between: the slope of a line connecting two points on a lane marking, and the average longitudinal distance from the camera to the line.

Figure 1:
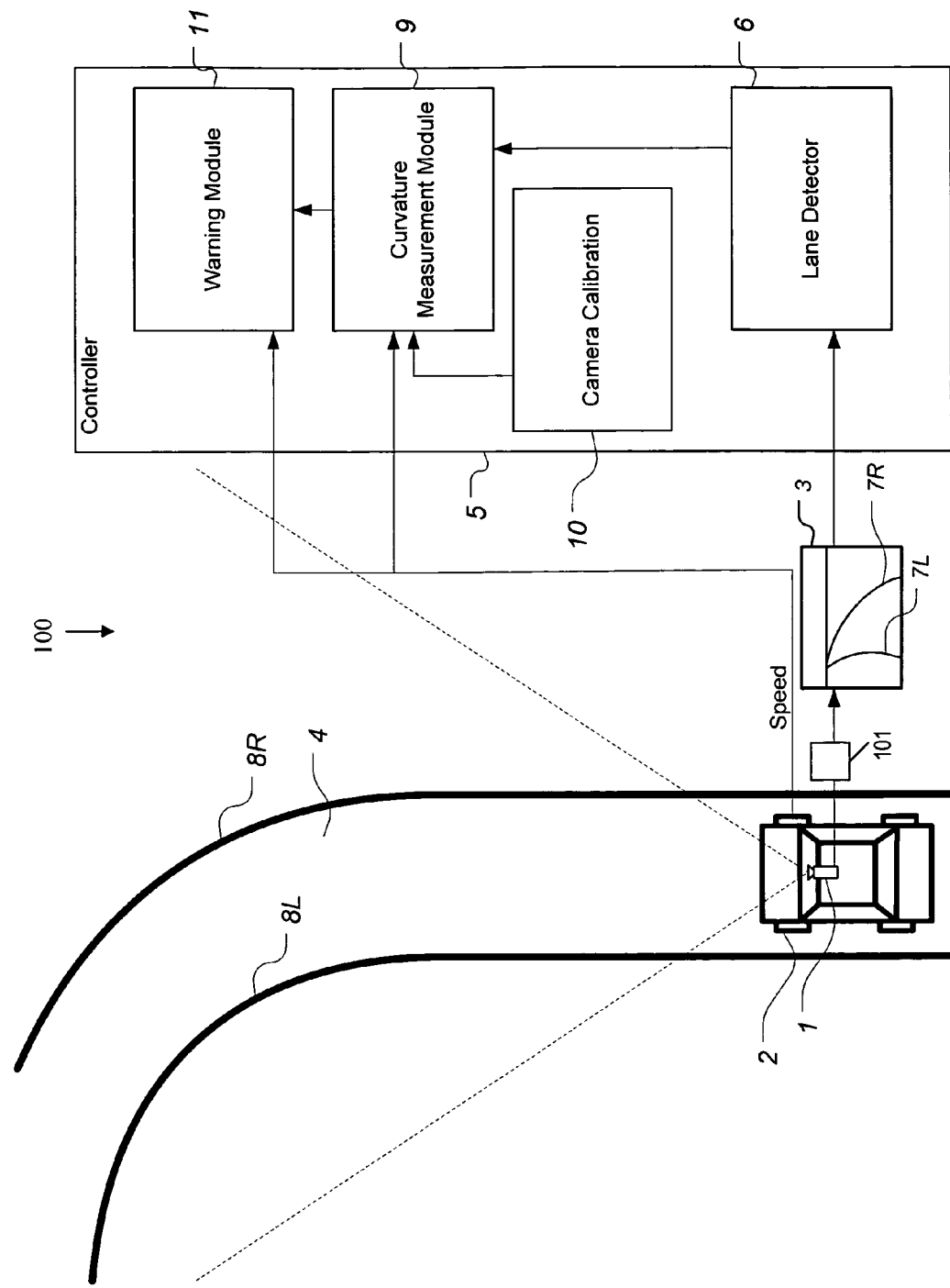
FIG. 1 shows a functional block diagram of a lane (road) curvature measurement system in conjunction with a vehicle, according to an embodiment of the invention.

FIG. 1 shows a functional block diagram of a lane (road) curvature measurement system 100 in conjunction with a vehicle 2 with a mounted camera 1, according to said implementation. The video camera 1 is mounted to the vehicle 2 in a forward pointing direction. The camera 1 captures (two dimensional (2-D)) images 3 of the lane (road/roadway) 4 in front of the vehicle 2 and transmits those images to a curvature measurement apparatus implemented as a controller 5, for analysis. For simplicity of description herein, lane markings and/or road boundaries are collectively called markings. A sampler 101 may be used for sampling digitized video input signals to create a perspective projected image as an array of pixels arranged in rows and columns.

In this example, the controller 5 includes a lane detector 6, a curvature measurement module 9, a camera calibration module 10 and a warning module 11. The lane detector 6 processes the image 3 by road characterization and tracks in the image 3, positions of image features 7L and 7R that represent the actual marking 8L, 8R, respectively, on the roadway 4. In relation to camera 1, marking 8L represents left side of the road, and marking 8R represents right side of the road. The positions and yaw angles of the markings 7L and 7R (relative to the camera position) are provided to the curvature measurement module 9 by the lane detector 6. The curvature measurement module 9 also receives speed information from the vehicle 2, and further receives calibration data (which may be provided by the calibration module 10). The curvature measurement module 9 preferably receives vehicle speed, lane marking position, and yaw angle information, on a regular basis.

Based on the vehicle speed information, camera calibration information the tracked positions and yaw angles of the markings 7L and 7R, the curvature measurement module 9 computes (in real-time) the curvature of the roadway 4 in front of the vehicle 2. The curvature measurement from the curvature measurement module along with the vehicle 2 speed may cause a warning module 11 to inform of vehicle drift towards the markings (providing, e.g. a run-off-road indication to the driver).

Figure 2:
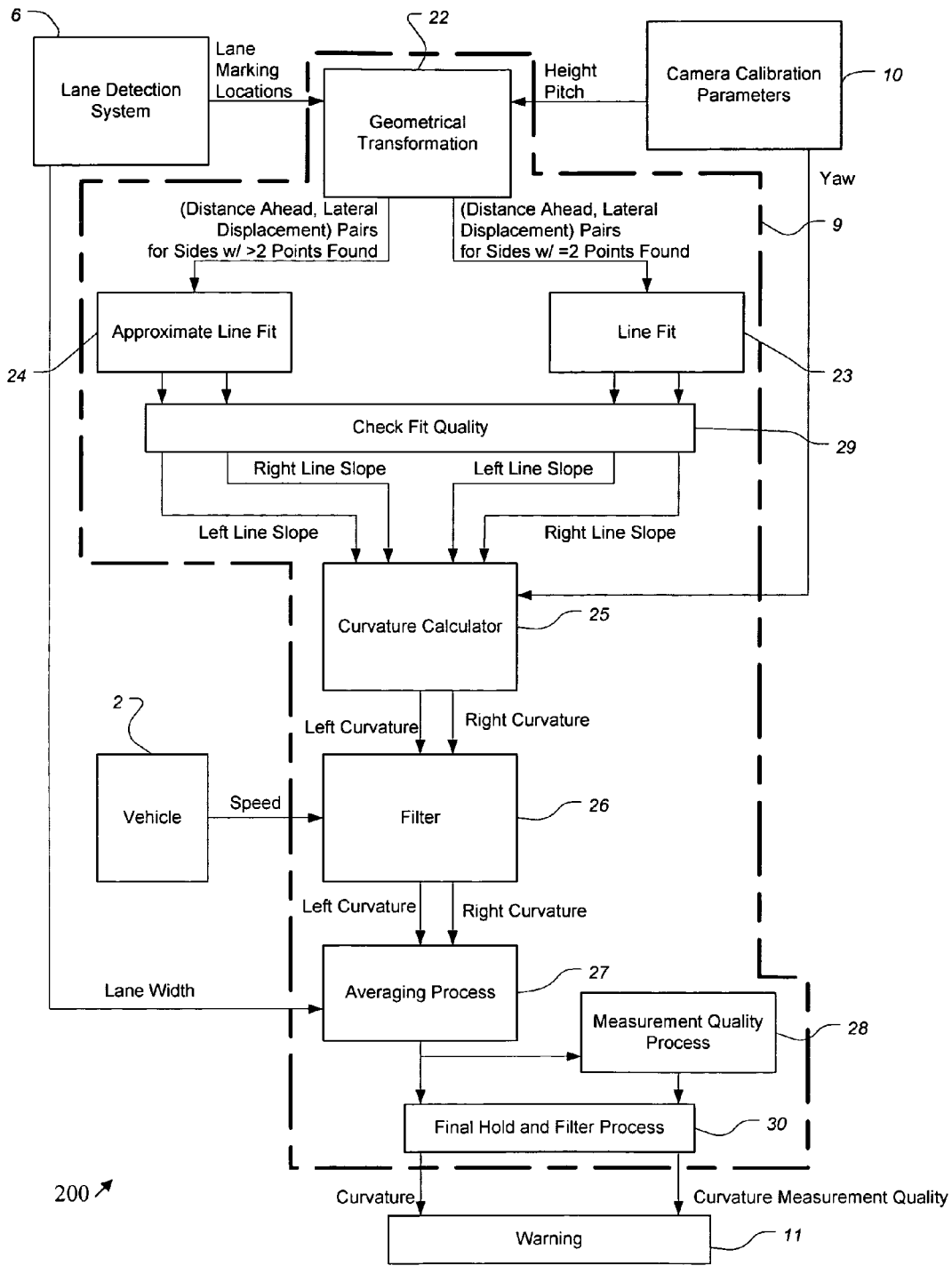
FIG. 2 shows a functional block diagram of a lane curvature measurement apparatus, according to an embodiment of the invention.

FIG. 2 shows a functional block diagram of an example architecture 200 for the curvature measurement module 9, according to the invention. The curvature measurement module 9 is shown as receiving: information from the lane detector 9, the camera calibration information 10, and speed information from vehicle 2.

The curvature measurement module 9 includes a geometrical transformation module 22, a curve fit component comprising a line fit module 23, an approximate line fit module 24, a curvature calculator 25, a filter 26, an averaging function 27, a measurement quality function 28, a fit quality check module 29, and a final hold and filter process module 30. The modules and components shown in FIGS. 1-2, can be implemented in many ways, such as program instructions for execution by a processor, as logic circuits, as an application specific integrated circuit, as firmware, as software modules, etc. The processed above can be performed in real-time, or on stored imagery. The processes may be also performed on a single CPU, with a preprocessing stage, or in multiple CPUs, as those skilled in the art will appreciate.

The curvature measurement module 9 uses the positions of markings or similar road delineations (e.g., 7L, 7R) determined by the lane detector 6 from the road image 3. Each image comprises a two dimensional array of pixels p (e.g. FIG. 3B), arranged as multiple rows and columns. Different rows of pixels p in the image represent positions at different distances ahead of the camera. The geometrical transformation module 22 geometrically transforms the marking positions from the image plane, described by their row, r, and column, w, location of image pixels, to the plane of the road 4 (i.e., from 2-D to 3-D).

Each image pixel of image features 7L, 7R, is transformed from an image pixel position (defined by r=i, and w=j in the image), to a road position defined by a distance ahead, DA, and a lateral offset distance, LO, relative to the camera (as a position (DA, LO)).

The transformed positions (DA, LO) are processed by the line fit modules 23, 24 (using a linear or higher order fit to the transformed positions). A fit quality module 29 checks the acceptability of the individual fits (i.e., left boundary line fits for the (DA, LO) positions of the left-hand markings 7L, and right boundary line fits for the (DA, LO) positions of the right-hand markings 7R). The curvature calculator 25 determines the curvature based on the accepted line fit outputs of the fit quality module 29, described in more detail below.

The separately calculated curvatures for the left- and right-hand markings are filtered by a filtering module 26 to remove noise, and the filtered curvatures of the left- and right-hand markings are combined by an averaging module 27. The quality of the combined values may be determined in a quality measurement module 28, generating curvature quality values. The final hold and filter module 30 repeats (holds) old curvature values as its output if no new values are available, and filters the combined values and the curvature quality values, producing the final curvature measurement signals to the warning module 11.

Figures 3A, 3B:
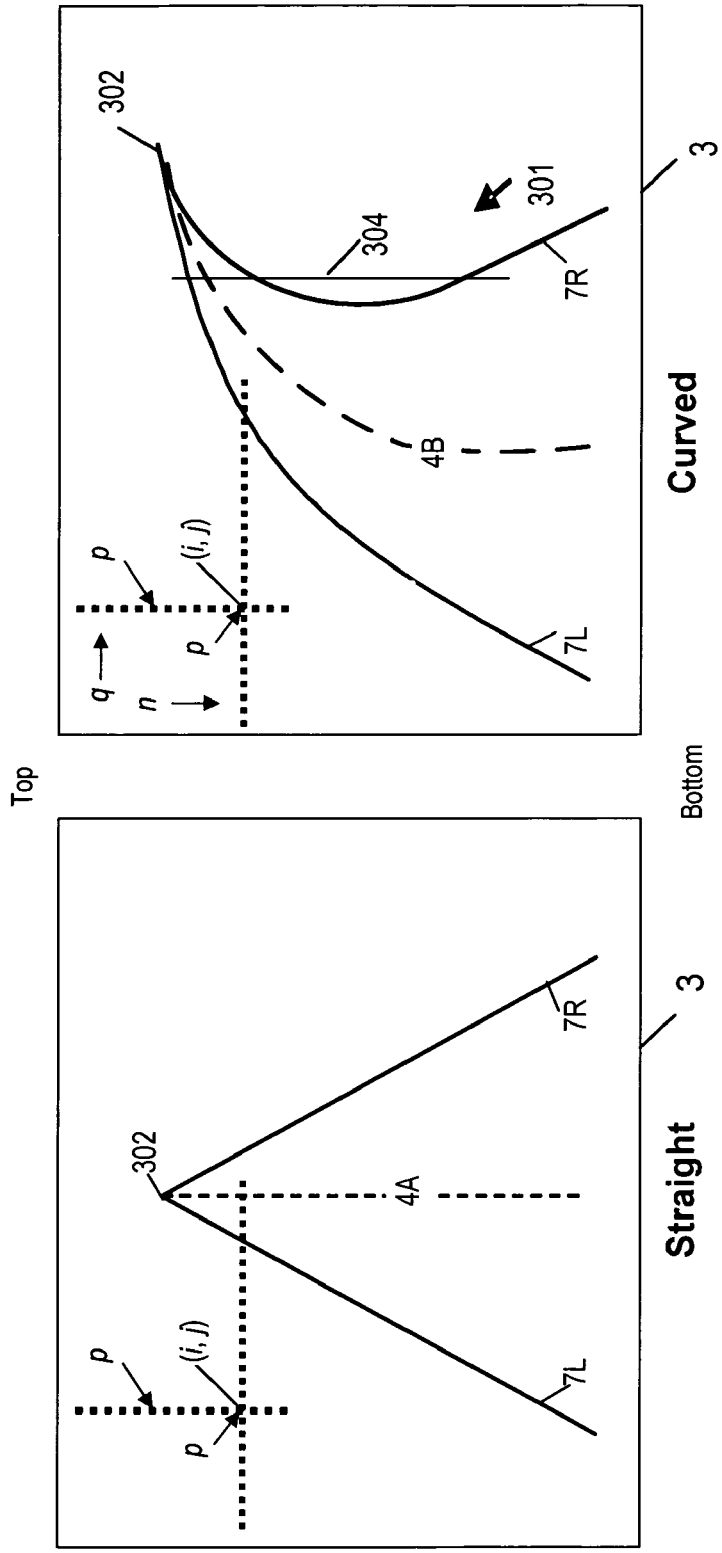
FIG. 3A shows an image of straight lanes (or road).
FIG. 3B shows an example schematic of the "leaning" effect of curved lanes (or road) compared to straight lanes (or road).

As shown by examples 250 and 300 in FIGS. 3A-B, respectively, curvature of the road 4 relates to a "slanting" of the road in the image 3 (e.g., video image 3 of a straight road 4A in FIG. 3A has no slant, but video image 3 of a curved road 4B in FIG. 3B has a slant 301 to the right in the image 3 in FIG. 3B). In FIG. 3A, any portion of the right-hand edge 7R of a straight road 4A always leans to the left relative to the centerline of the road, whereas in FIG. 3B a line 304 crossing the same edge 7R of a curved road 4B can lean up or to the right.

This curved road slanting characteristic of marking images 7L, 7R, in the video image 3 is directly proportional to the actual road curvature, once the yaw angle of the camera 1 is accounted for. The slanting of the marking images 7L, 7R can be characterized by the row and column value of each pixel position on the marking images 7L, 7R (e.g., relative to a the optical axis is a position 302 in the image 3, where the image markings 7L, 7R, merge in the image). A measure of the slanting of marking images 7L, 7R in the image 3 provides a lateral offset distance of the positions of actual markings 8L, 8R, relative to the camera position, taking the lateral location of the optical axis 302 as a reference.

Figure 4A:
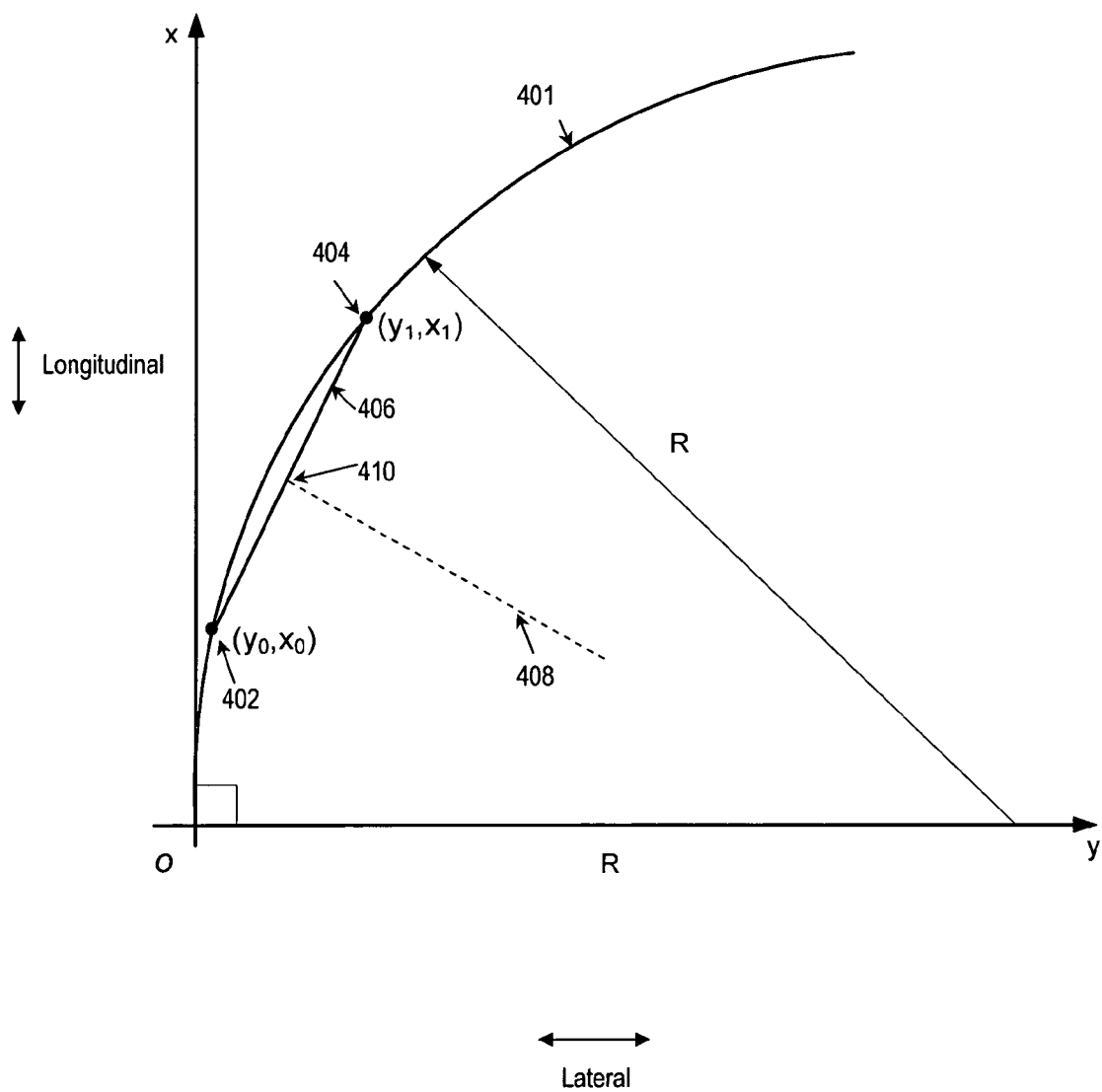
FIG. 4A shows an example coordinate system for curvature calculation, according to an embodiment of the invention.

Referring to FIG. 4A, the curvature of the road may be obtained as a function of said measure of slanting, based on the Cartesian coordinate system on the plane 400 of the road 4, as described below. The mathematical expression for this curvature is now derived, starting from a set of points with coordinates (y, x) measured in the plane of the road 4 (e.g., points on markings 8L, 8R). Each image pixel on features 7L, 7R, is transformed from an image pixel position (defined by a row i, and column j in the image), to a road position defined by coordinates (y, x) on the plane of the road. Given a point with coordinates (y, x) on a marking 8L or 8R on the road 4, then: the coordinate x for that point represents said longitudinal distance DA between the camera and that position, and the coordinate y for that point represents said lateral offset distance LO relative to the camera. The curvature C of the road 4 is determined based on the x and y coordinates of points associated with actual marking 8L, 8R in the plane 400 of the road 4. The pixel positions of image markings 7L, 7R in the image 3, are transformed to the x and y coordinates of points associated with the actual markings 8L, 8R in the plane of the road 4, based on the row and column coordinates of the corresponding points in the image (e.g., 7L and 7R in FIG. 1).

A mathematical expression is now provided for the radius R relating two points (positions) 402, 404 on a curve 401 (e.g., defined by 8L or 8R) with the radius R. The point 402 is at coordinate $(y_0, x_0)$ and the point 404 is at coordinate position $(y_1, x_1)$, wherein $x_0$ and $x_1$ are the longitudinal distances from the origin O of measurement (i.e., distances ahead from the camera 1), and $y_0$ and $y_1$ are the corresponding lateral offsets (i.e., to the left of the camera 1, or to the right of the camera 1). In FIG. 4A, the radius R lies in the plane of the road 4, and the curve 401, representing road curvature, is assumed to be tangent to the x-axis at x=0 (this tangent condition is equivalent to the camera having zero yaw angle at zero distance).

A point midway between coordinates $(y_0, x_0)$ and $(y_1, x_1)$ is at $$\left(\frac{y_0 + y_1}{2}, \frac{x_0 + x_1}{2}\right).$$

The slope m of a line (chord) 406 connecting the coordinates $(y_0, x_0)$ and $(y_1, x_1)$ is $$m = \left(\frac{x_1 - x_0}{y_1 - y_0}\right).$$

The slope k of a line 408 perpendicular to the line 406 between coordinates $(y_0, x_0)$ and $(y_1, x_1)$ is then $$k = \left(\frac{y_1 - y_0}{x_0 - x_1}\right)$$

(i.e., slope k is the negative inverse of slope m). The mathematical expression for the perpendicular bisector 408 to the line 406 between coordinates $(y_0, x_0)$ and $(y_1, x_1)$ is then $$x = \left(\frac{y_1 - y_0}{x_0 - x_1}\right) y + b.$$

To calculate b, the coordinate position of a mid-point 410 of the line 406 between coordinates $(y_0, x_0)$ and $(y_1, x_1)$, where the line 408 bisects the line 406 at point 410, can be obtained as $$\frac{x_0 + x_1}{2} = \left(\frac{y_1 - y_0}{x_0 - x_1}\right)\left(\frac{y_0 + y_1}{2}\right) + b, \text{ or}$$

$$b = \frac{x_0 + x_1}{2} + \frac{(y_0^2 - y_1^2)}{2(x_0 - x_1)}.$$

This provides $$x = \left(\frac{y_1 - y_0}{x_0 - x_1}\right) y + \frac{x_0 + x_1}{2} + \frac{(y_0^2 - y_1^2)}{2(x_0 - x_1)}.$$

Setting x=0, and solving for y to obtain the radius R of the curve 401, then:

$$0 = \left(\frac{y_1 - y_0}{x_0 - x_1}\right) y + \frac{x_0 + x_1}{2} + \frac{(y_0^2 - y_1^2)}{2(x_0 - x_1)},$$

or $$-\left(\frac{x_0 + x_1}{2}\right) + \frac{(y_1^2 - y_0^2)}{2(x_0 - x_1)} = \left(\frac{y_1 - y_0}{x_0 - x_1}\right) y,$$

or $$y = \frac{1}{2}\left(\frac{x_0 - x_1}{y_1 - y_0}\right)\left(\frac{(y_1^2 - y_0^2)}{(x_0 - x_1)} - (x_0 + x_1)\right),$$

or $$y = \frac{y_1^2 - y_0^2 - x_0^2 + x_1^2}{2(y_1 - y_0)} = R.$$

For large road curve radii (R>100 meters), it can be shown that $y_1$ and $y_0$ (and the difference $y_1^2 - y_0^2$) are small relative to the terms $x_1^2$ and $x_0^2$ and can be neglected, wherein $$R \cong \frac{x_1^2 - x_0^2}{2(y_1 - y_0)} = \left(\frac{x_1 + x_0}{2}\right)\left(\frac{x_1 - x_0}{y_1 - y_0}\right).$$

As such, radius R of road curvature 401 can be approximated as:

R≅(average of $x_0$ and $x_1$)/(slope of the line between $(y_0,x_0)$ and $(y_1,x_1)$), wherein "/" represents division.

Curvature is the inverse of the radius, equal then to:

(Slope of the line between $(y_0,x_0)$ and $(y_1,x_1)$)/ (average of $x_0$ and $x_1$).

As such, a measure of curvature C can be obtained as:

C=f(R)=f(m, avg $(x_0,x_1)$), wherein avg is a mathematical averaging operation, and the coordinates $x_0$, $x_1$, $y_0$ and $y_1$ are all measured in the plane of the road 4.

Figure 4B:
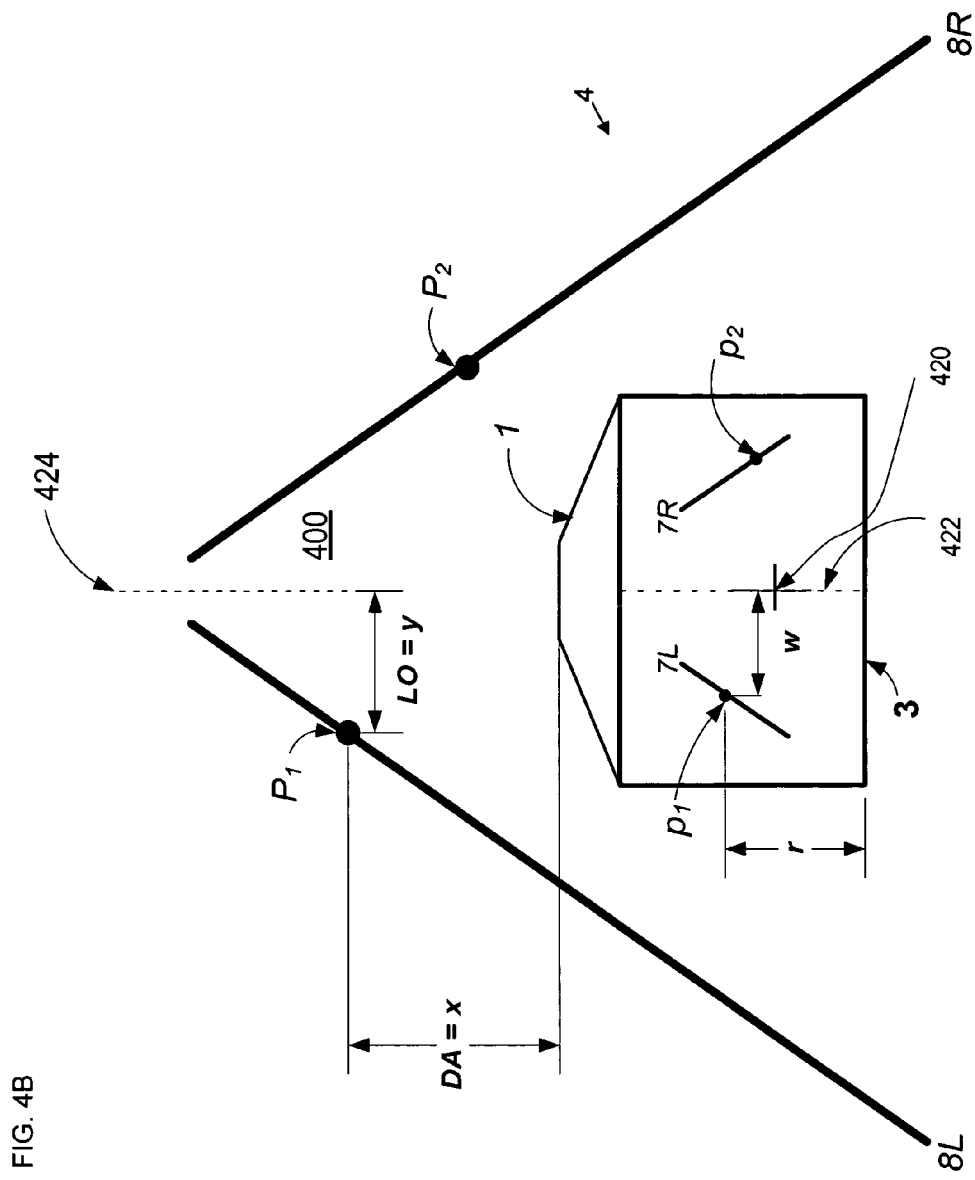
FIG. 4B shows an example of relationship between pixels in the image plane and corresponding points on the road plane that produced the image pixels via the camera.

To determine curvature C of the road 4 based on the pixel positions of image markings 7L, 7R in the image 3, first we determine the x and y coordinates of points associated with actual marking 8L, 8R in the plane of the road 4, based on the row and column coordinates of the corresponding pixels in the image (e.g., 7L and 7R in FIG. 1). FIG. 4B shows an example 400 illustrating the relationship between pixels in the image plane and corresponding points P on the road plane that produced the image pixels p via the camera. An image 3 of the road 4 is superimposed on the plane 400 of the road 4. A first pixel $p_1$ at a first row and column position in the image 3 corresponds to a first road plane point $P_1$. Similarly, a second pixel $p_2$ at a second row and column position in the image 3 in the image corresponds to a road plane point $P_2$. Transforming from the pixel p1 at image position (r, w) to the point $P_1$ at road plane position (x, y), involves finding coordinate x based on row r, and finding coordinate y based on column w. As similar transformation is applied for the point $P_2$ and the pixel $p_2$.

As such, given the points $P_1$ and $P_2$ on the markings 8L and 8R, the distance of each point from the camera 1 (i.e., longitudinal distance ahead of the camera DA=x, and the lateral offset distance from the road centerline, LO=y) can be determined from the row and column (i.e., r, w) positions of corresponding pixels p1 and $p_2$ on the marking images 7L, 7R, in the image 3. As such, y is the distance from the line defined by the optical axis plane slicing the road plane.

Figure 5A:
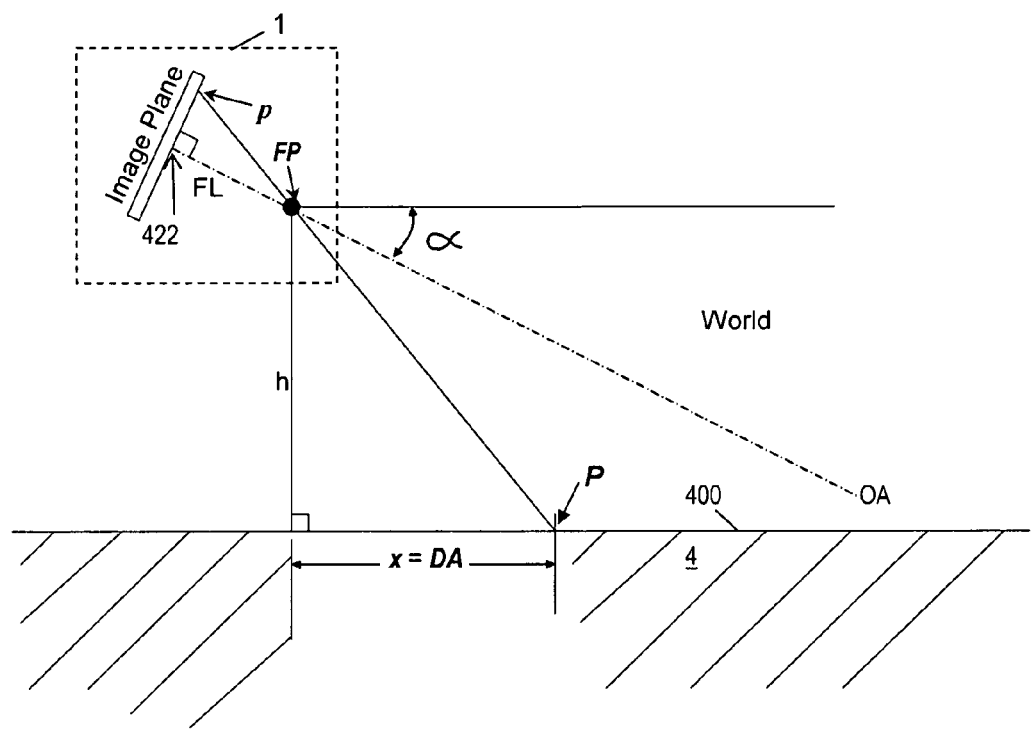
FIG. 5A shows an example side view of camera in relation to the road, illustrating the relationship between the image plane and the distance ahead on the road.

To determine the x coordinate for each road point P (e.g., $P_1$, $P_2$) based on a corresponding image pixel p (e.g., p1, $p_{22}$) the following steps may be used. Example 500 in FIG. 5A shows a relationship between the image plane and the distance ahead on the road. A pixel p on an image pixel row r=n, can be associated with a real world distance ahead DA=x for the corresponding point P on the road 4, as:

$$n=(FL/\text{pixelsize})\tan(\alpha-\tan^{-1}(h/x)),$$

wherein h represents camera height, angle α represents the camera pitch angle, pixelsize represents the vertical size of each pixel in the image, and FL represent the focal length of the lens of camera 1. The parameters h, α, pixelsize and FL, are calibration parameters provided by the calibration module 10 (FIG. 1).

As such, the real world distance x of a point P ahead of the camera 1 can be obtained as:

$$x=h/\tan(\alpha+\tan^{-1}(n*\text{pixelsize}/FL)).$$

Figure 5B:
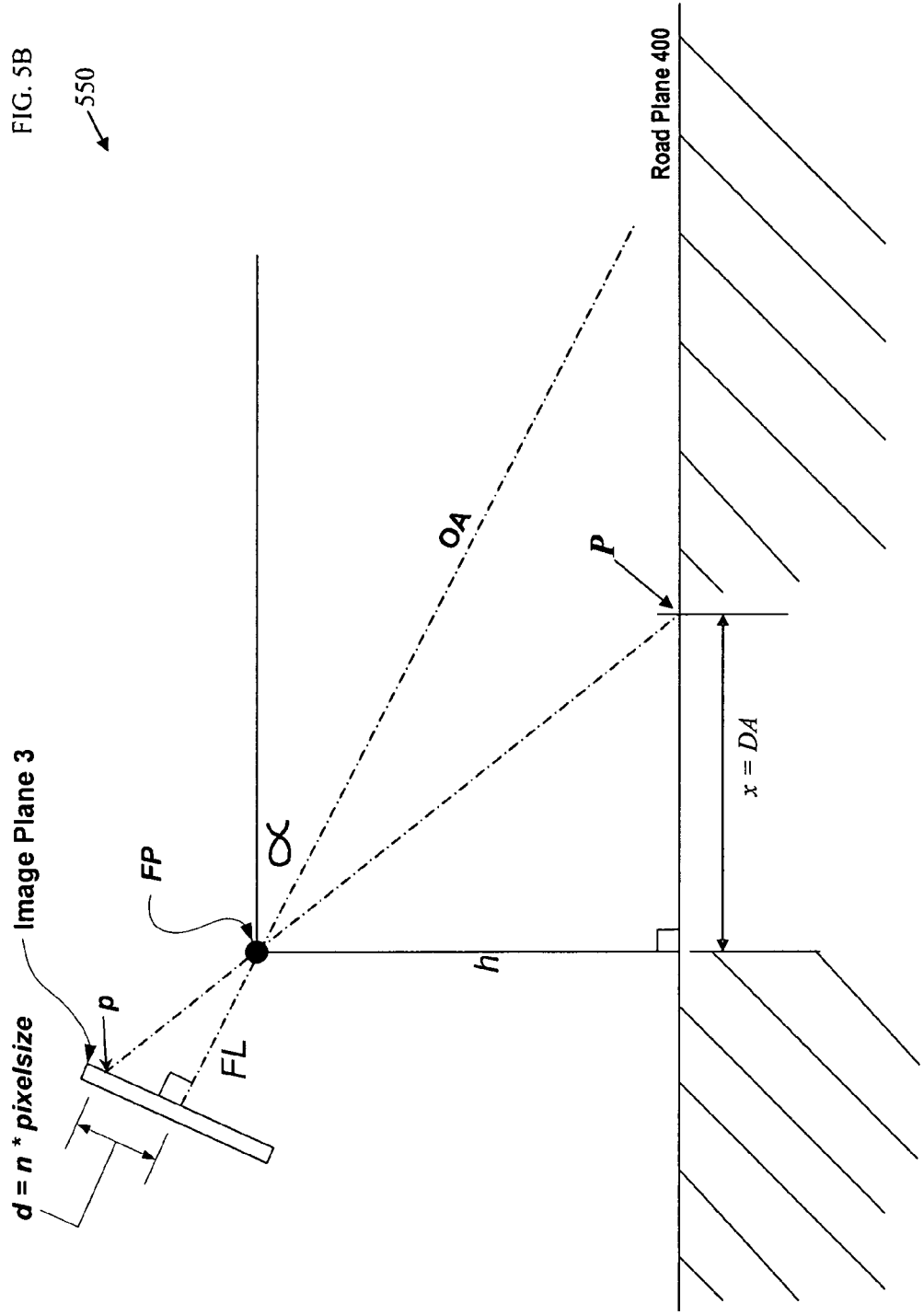
FIG. 5B shows an example of side view of an imager viewing the road, and the elements of the relationship between and image row and distance ahead from the camera.

FIG. 5B shows another example wherein the camera viewing the road plane 400. The image pixel row n is measured in relation to the optical axis (OA), which is the line extending perpendicularly from the imager through the camera lens focal point (FP). A pixel row coordinate n for a pixel p in the image plane 3 is transformed to the longitudinal (horizontal) distance x=DA of the corresponding point P on the road plane ahead of the camera focal point (FP). For a pixel p in the image (e.g., pixel at row r=n), the distance d in pixels represents distance of the pixel p in the image (e.g., at column w=d) relative to a reference position in the image (such as the Optical Axis).

Figure 5C:
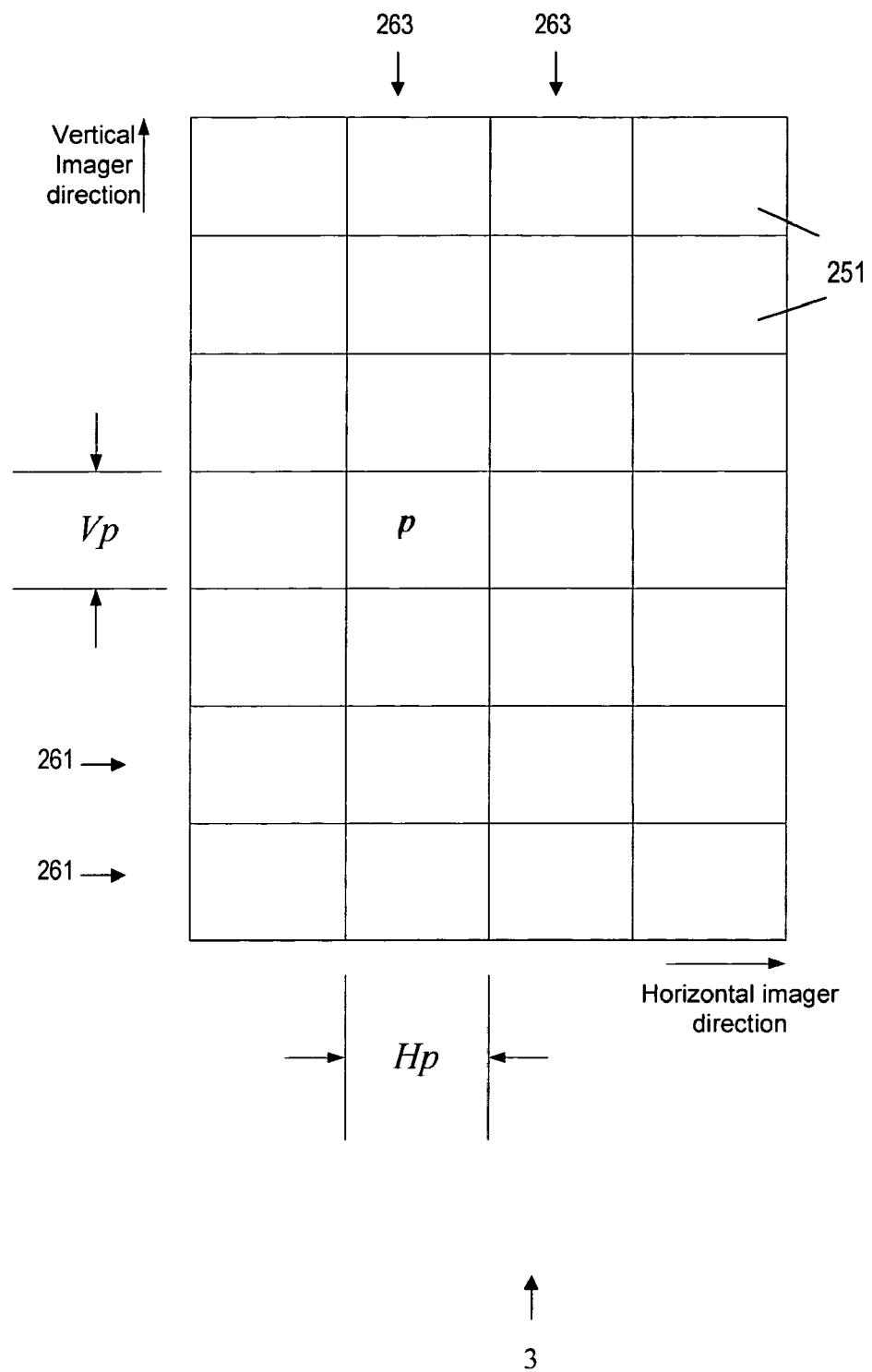
FIG. 5C shows an example of array of image pixels, arranged in rows and columns, illustrating a vertical pixel size Vp and horizontal pixel size Hp, in a road image.

To determine the lateral distance LO=y coordinate for said point P on the road plane 400, corresponding to said pixel p at row r=n and column w=q wherein q=d in the image plane 3, the following steps may be used. The column w=d can be associated with a real world distance y (FIG. 4B), as:

$$d=(y*(FL^2+n^2*Vp^2)^{1/2}/Hp*(h^2+x^2)^{-1/2}),$$

or $$y=d*Hp*(h^2+x^2)^{1/2}/(FL^2+n^2*Vp^2)^{1/2},$$

wherein as shown in FIG. 5C, Vp is vertical pixel size and Hp is horizontal pixel size in the image 3. An example of image 3 is shown in FIG. 5C, s a two-dimensional array of pixels 251 arranges as rows 261 and columns 263.

Figure 4C:
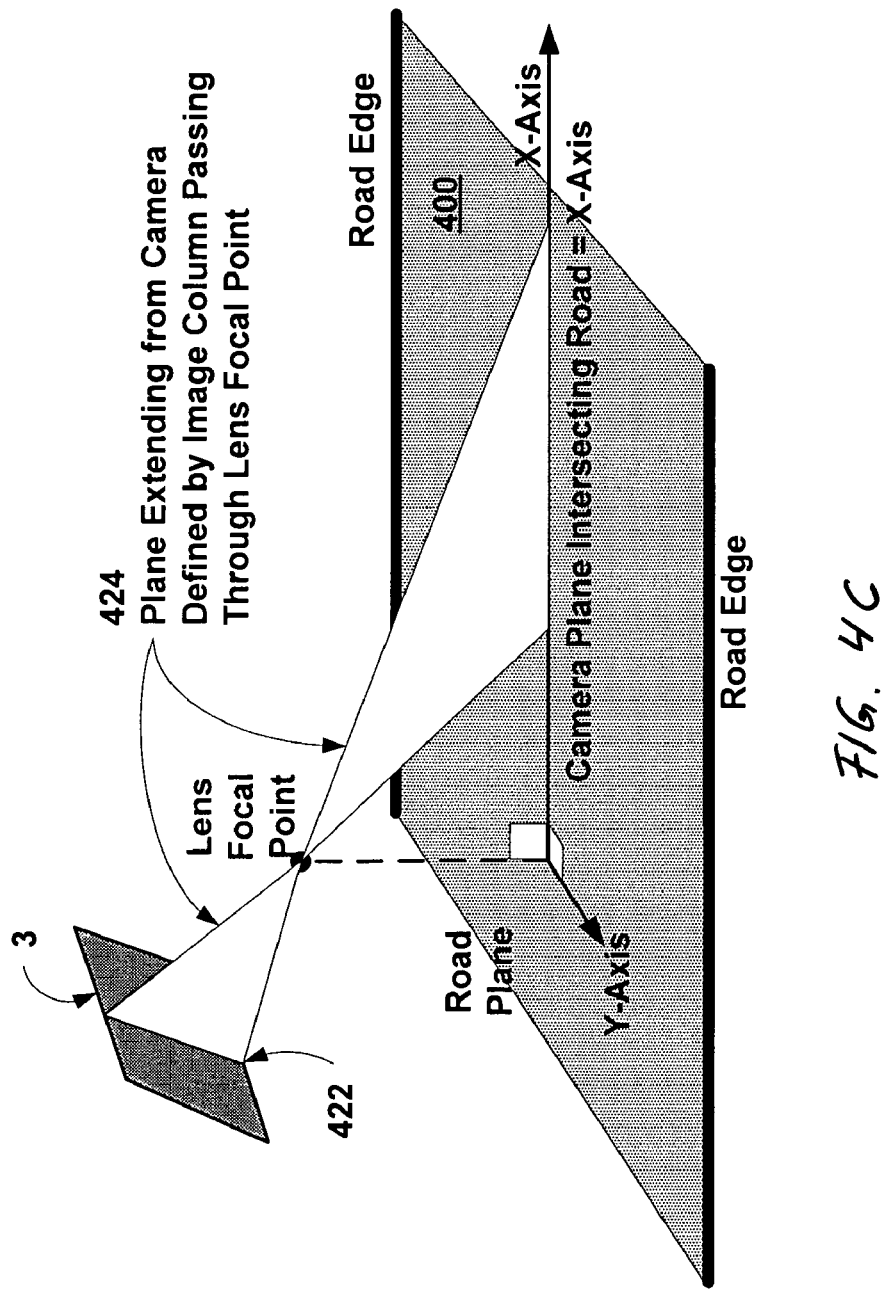
FIG. 4C shows another example of relationship between pixels in the image plane and corresponding points on the road plane.

Column and row are both measured in relation to the optical axis location, and can thus be positive or negative. As pixels are discrete, floating point values are rounded to the nearest integer. Distances in the road plane may be measured relative to the camera as follows. For the origin of the (x, y) measurements, a perpendicular line is extended from the camera lens focal point FP to the road plane. The optical axis point 420 in the image plane (FIG. 5A) and the lens focal point FP together define a line OA. The column 422 in the image corresponds to the OA. A plane 424 containing the column 422 and the focus point FP (FIG. 4C) slices the road plane ahead 400. The intersection of plane 424 and road plane 400 defines the x-axis. Distance ahead is measured from the origin, in the direction of the x-axis. The lateral distance y is measured perpendicular to the x-axis. For a camera that points straight ahead the OA column 422 is used, and that for a camera that may point partly to the side (is installed with a non-zero yaw), the vanishing point column is used. As such, for a camera with non-zero static yaw (where the camera does not point in the same direction as the centerline of the vehicle), a different image column is taken instead as the reference to project forward. That is column is that of the vanishing point VP of a straight road in the image, with the vehicle pointing straight ahead. The vanishing point location is first given by a factory calibration and can then be further learned from an online process.

The marking images 7L or 7R may have widths greater than 1 image pixel at the row measured. In that case, the inner-most pixels (right most pixel on the left lane marking 7L and left most pixel on the right lane marking 7R) are utilized for further calculation. All the (r, w) coordinates of the pixels p for markings 7L or 7R in the image 3, are converted to (x, y) coordinate pairs for corresponding points P on the markings 8L, 8R on the road. The points P corresponding to pixels of 7L (i.e., left side points) are separated from the points P for the pixel 7R (i.e., right side points), with each set of points treated individually for line fitting. Specifically the left side set of points are processed by one line fit process in module 23 (FIG. 2), and the right side set of points are processed by another line fit process in module 23.

Figure 6:
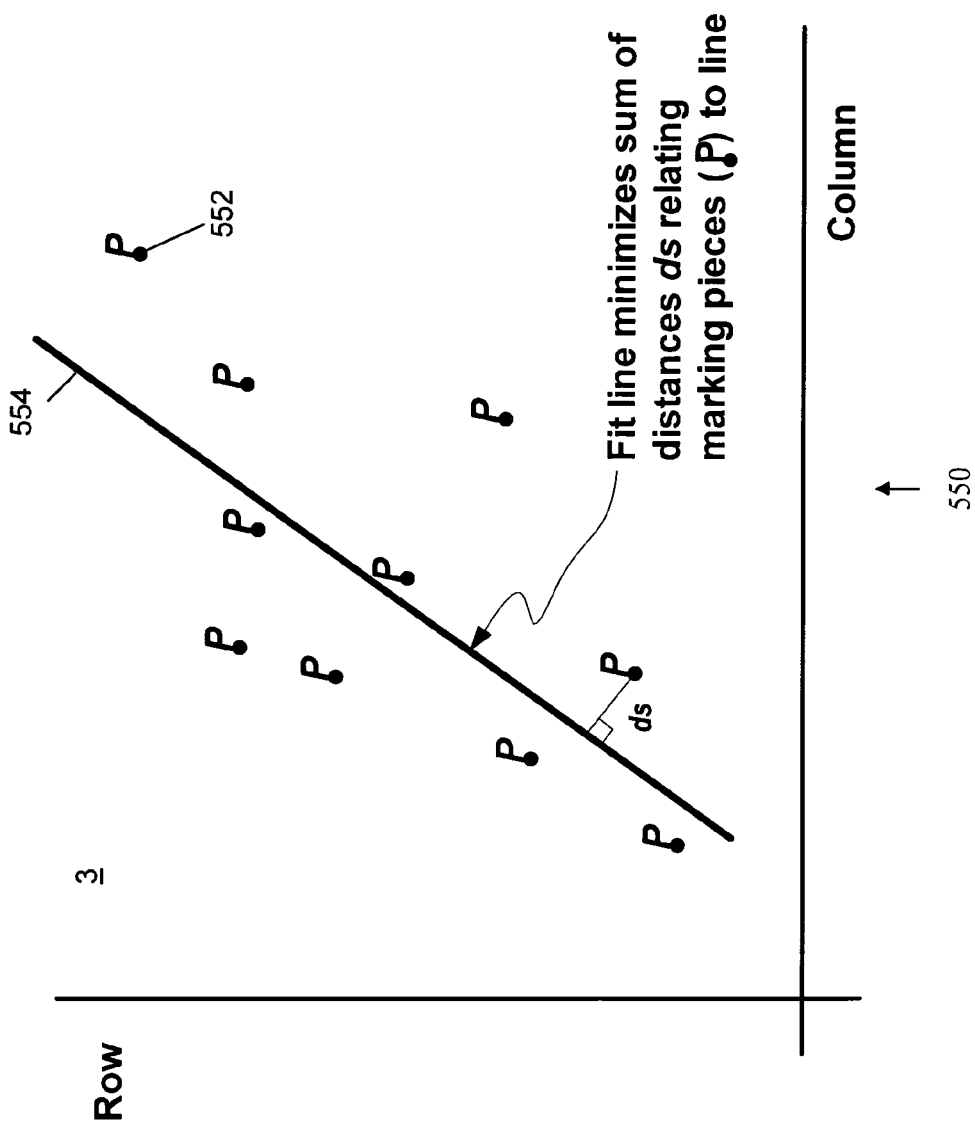
FIG. 6 shows an example of least-squares line/curve fitting.

FIG. 6 shows an example 500 of line fitting involving a least-squares fit, by minimizing the sum of the distances ds from data points 502 (e.g., pixels or marking features/pieces p) to a fit curve or line 504. Least-squares fitting finds a curve that best fits a set of data points. For example, as shown in FIG. 6, fitting curve or line (as shown here) is adjusted until the sum of the distances ds from each point 502 to the line 504 is minimized. This corresponds to making the average distance from the data to the line fit/curve be a minimum. A least median fit minimizes the median distance from the data to the fitting curve. Other to curve/line fitting approaches may also be used.

In application, for each set of points, line fitting involves determining a line fit for all the points between, and including, the nearest and the farthest points with coordinates (x, y) in each of said set of points. The line fit method used is dependent upon the number of points available to fit, as follows. For lines with exactly two points, the line fit module 23 implements a simple algebraic line fit is applied. This fit is performed by the standard line fit module 32. When more than two points are available, a line many not pass through all of the points, though an approximate scheme may fit the points well enough. Therefore, the points are passed to the approximate line fit module 24, where the approximate fitting is performed in a standard least-squares sense or in a least median distance sense. In both cases, the distance ahead x and the lateral distance to the side y, in the plane of the road, are expressed as:

$$y=\text{slope}*x+\text{intercept},$$

wherein, slope provides the curvature after division by the average (AV) of the nearest and furthest distances ahead.

For only two points, slope is the value m described above. For more than two points, slope is that of a least-squares line fit for the points (FIG. 6). The curvature C can be approximated as:

$$C=(\text{slope})/(\text{average of distance x to nearest and furthest points ahead}).$$

Figure 7:
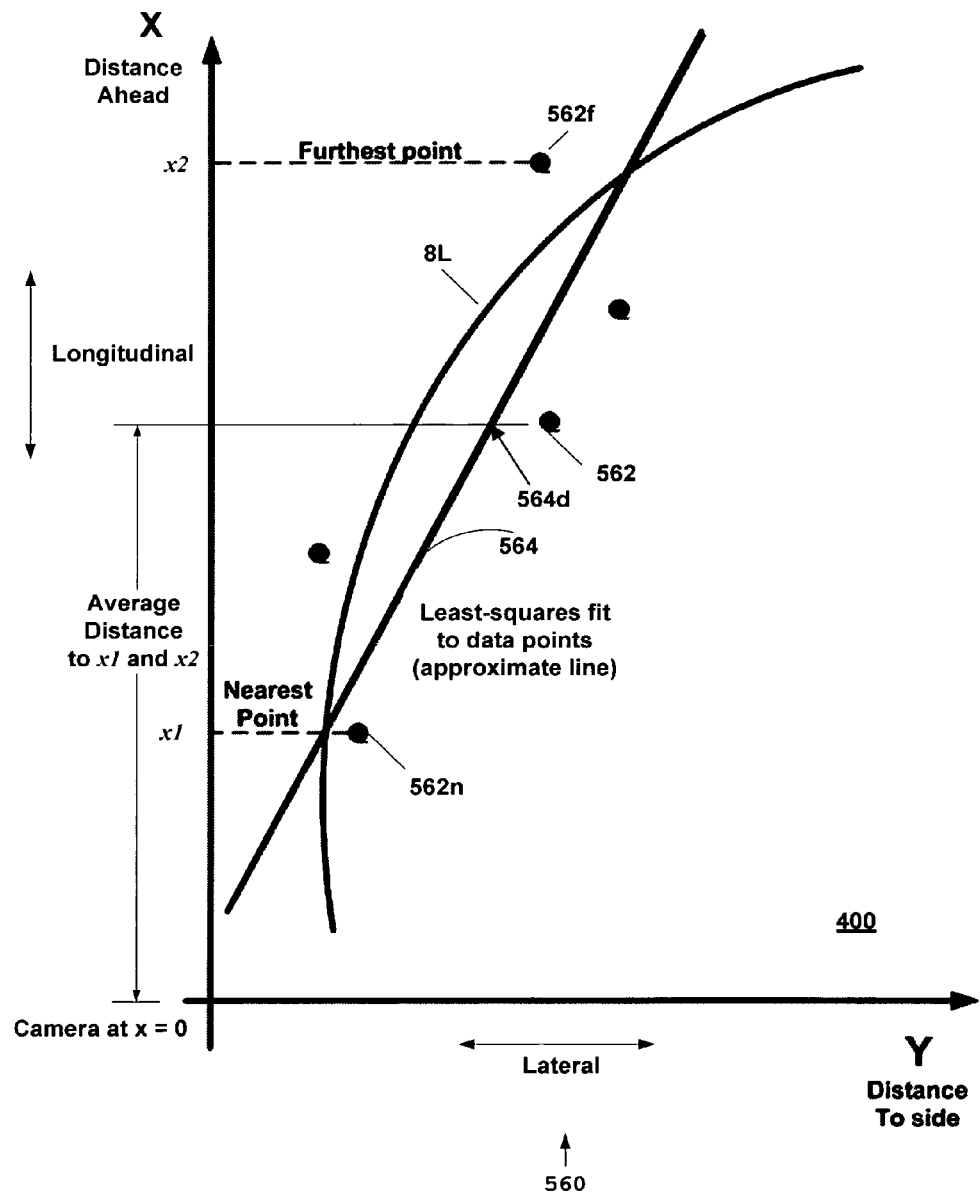
FIG. 7 shows an example of nearest and furthest points from a least-squares line fit to road-plane data.

FIG. 7 shows an example 560 of a nearest point 562n and a furthest point 562f from a least-squares line fit 564 to multiple road-plane points 562 (P). The average distance ahead to the nearest and furthest points (i.e., AV=(x1+x2)/2)) divides the slope of the line 564 at 564d, providing the curvature C. The points on the road in FIG. 7, correspond to pixels in an image of the road such as FIG. 6, according to the geometrical transformation described further above.

The approximate fitting can be performed in a least-squares sense or in a least median distance sense. A number of quantities describe the fitted line, and are calculated along with it, including: how many points were used to construct the fit; the chi-squared statistic (which measures how well the model fits the data points); the uncertainty in the fit coefficients; the distance difference, in the road plane, between the nearest and furthest point used to calculate the fit; the maximum error between the fitted line and the individual data points, etc.

If too few data points are used for the line fit, or chi-squared is too large, or the uncertainty in the slope of the fit is too large, or the nearest to furthest distance difference is too small (less than a certain threshold), or the maximum error between the fit and the points is too large (we take the perpendicular distance to all the points from the line fit and find the maximum), the line fit is rejected. If the nearest and furthest points in a set of points are too close together, the curvature computation may become unreliable. As such, the distances between nearest points, and furthest points are checked to be each of at least a certain length. The thresholds for rejection of a fit are found from experience.

If the line fit is acceptable based on the above line fit and nearest/farthest distance criteria, then the nearest and farthest points with coordinates (x, y) on a line fit (i.e., y=slope*x+intercept), are passed to the curvature calculator 25 to determine the curvature, C, values for the road 4 based on the derivation further above, as:

$$\text{Radius} \cong \left(\frac{x_1 + x_0}{2}\right)\left(\frac{x_1 - x_0}{y_1 - y_0}\right).$$

As such, is approximately the product of the average distance from the camera to two points 402, 404 (FIG. 4A), on or near a lane marking 401 and the slope m of the line 406 between those two points 402, 404. The best results are obtained by using the nearest and furthest points, Curvature is the inverse of the radius just above.

As measurement noise is generally present, however (the pixels p that are transformed to points P, may be given as whole integer values, or possibly, to sub-pixel precision), the raw curvature C is filtered using a speed dependent, equally-weighted, finite-impulse response filter 26 which averages the C values over a fixed distance. The filter length is chosen to represent a fixed length of travel, so that at higher speeds, the filter length is shorter. This speed-variable averaging removes noise and maintains local spatial detail, even at higher speeds.

Higher order line fits ($2^{nd}$ order and higher) directly generate the curvature C and the variation in curvature with distance (the clothoid parameter, from $3^{rd}$ order and higher). The second order term is directly related to curvature and the third order term is directly related to the clothoid parameter. Higher order fits can only be used when sufficient marking pixels p(r, w) have been located in the image (and transformed to road plane points P(x, y)) to produce an overdetermined system (e.g., at least 4 points are required for a second order fit and at least 5 for a third order fit). The least-squares fit over a larger numbers of point (r, w) image pixels stabilizes the curvature measurements, as higher order polynomials are prone to overfit the data.

Markings 8L or 8R, and corresponding image features 7L, 7R, can be present on both sides of the road in a single image 3 and each can produce a curvature measurement as shown in FIG. 2. All curvature measurements C (left curvature $C_L$ and right curvature $C_R$) are passed to the averaging process 27. If both sides produce acceptable fits (judged using the life fit criteria described earlier), the curvatures C from each side are averaged (e.g., sum of the curvatures $C_L$ and $C_R$, divided by 2) to produce a final curvature value $C_F$. corresponding to the curvature of the center line the road or lane. The averaging of curvatures $C_L$ and $C_R$ reduces noise. If only one acceptable line fit is found, the output of the averaging process 27 is that value. In small radius road curves, it may be desirable to account for the lane width, since the curve inner radius may be a few percent smaller than that of the curve outer radius.

A measurement quality process 28 determines a "curvature quality" value that is related to the last time an acceptable curvature measurement $C_F$ was received. The quality may have e.g. a maximum value of 1.0 (best) to a minimum of 0.0 (worst). If the most recent measurement $C_F$ has one or both sides ($C_L$ and $C_R$) with acceptable values, then the curvature quality is reset to 1.0. If the last acceptable measurement was F frames (images) ago, then subsequent curvature quality rating values decrease, linearly wherein:

curvature quality=1.0−(F/maximum number of frames to coast).

The denominator (i.e., maximum number of frames to coast), is set to a value (again speed-dependent) related to how long, distance-wise or time-wise, an old curvature measurement is expected to represent the (possibly changing) local curvature. For each image frame, the steps and calculations, above, are executed on pixels of 7L and 7R as they appear in that frame, If only one side ($C_L$ or $C_R$) produces an acceptable curvature value, then the acceptable value is used as the curvature output. The curvature quality is set to 1.0, even if only one side has an acceptable value. If nether side has an acceptable value, the last valid curvature values are held (with a zero or first order hold), and the curvature quality is decremented as described above. Both the curvature quality and curvature values may pass through final, variable-length, low-pass, noise-reducing filters. The curvature is the inverse of radius, so its units are inverse length.

The filter length or the constants determining the filter dynamics are speed dependent. The speed dependence effectively makes the behavior of each filter spatially dependent. In one example, the spatial length is set to approximately 12 meters, such that curves are effectively piecewise linearly approximated with sliding segments of this length. The result of this variable length filtering is to maintain local detail even when the vehicle is traveling rapidly.

Figure 8:
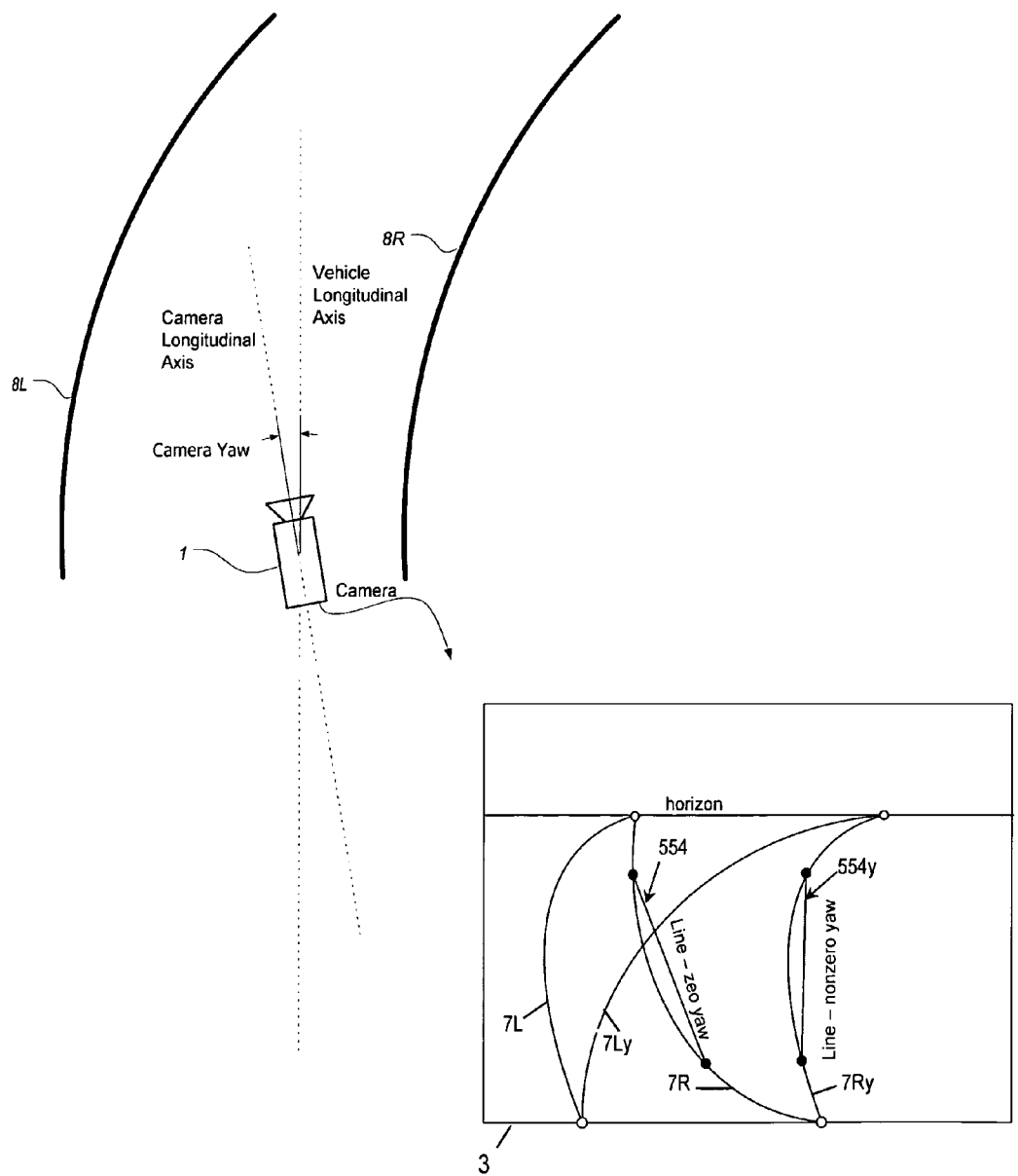
FIG. 8 shows the influence of zero and non-zero camera yaw angles on the slope of a line connecting two points on the edge of a curve.

FIG. 8 shows that the yaw angle of the camera affects the apparent slope of the line fit used to measure the slanting of the road in a curve. Image features 7L, 7R correspond to zero camera yaw angle, and image features 7Ly, 7Ry, correspond to a nonzero camera yaw angle. The line fit 554 corresponds to zero camera yaw angle, and the line fit 554y corresponds to a nonzero camera yaw to angle. By accounting for the yaw angle in the image, the camera is essentially forced to point straight ahead and the above relationship (C=Slope divided by AV), may be used. Yaw angle directly changes the slope of the line fit, both in the image and on the ground. As such, a nonzero yaw angle is subtracted from the slope of the line fit 554y to obtain a corrected slope corresponding to the line fit 554.

Figure 9:
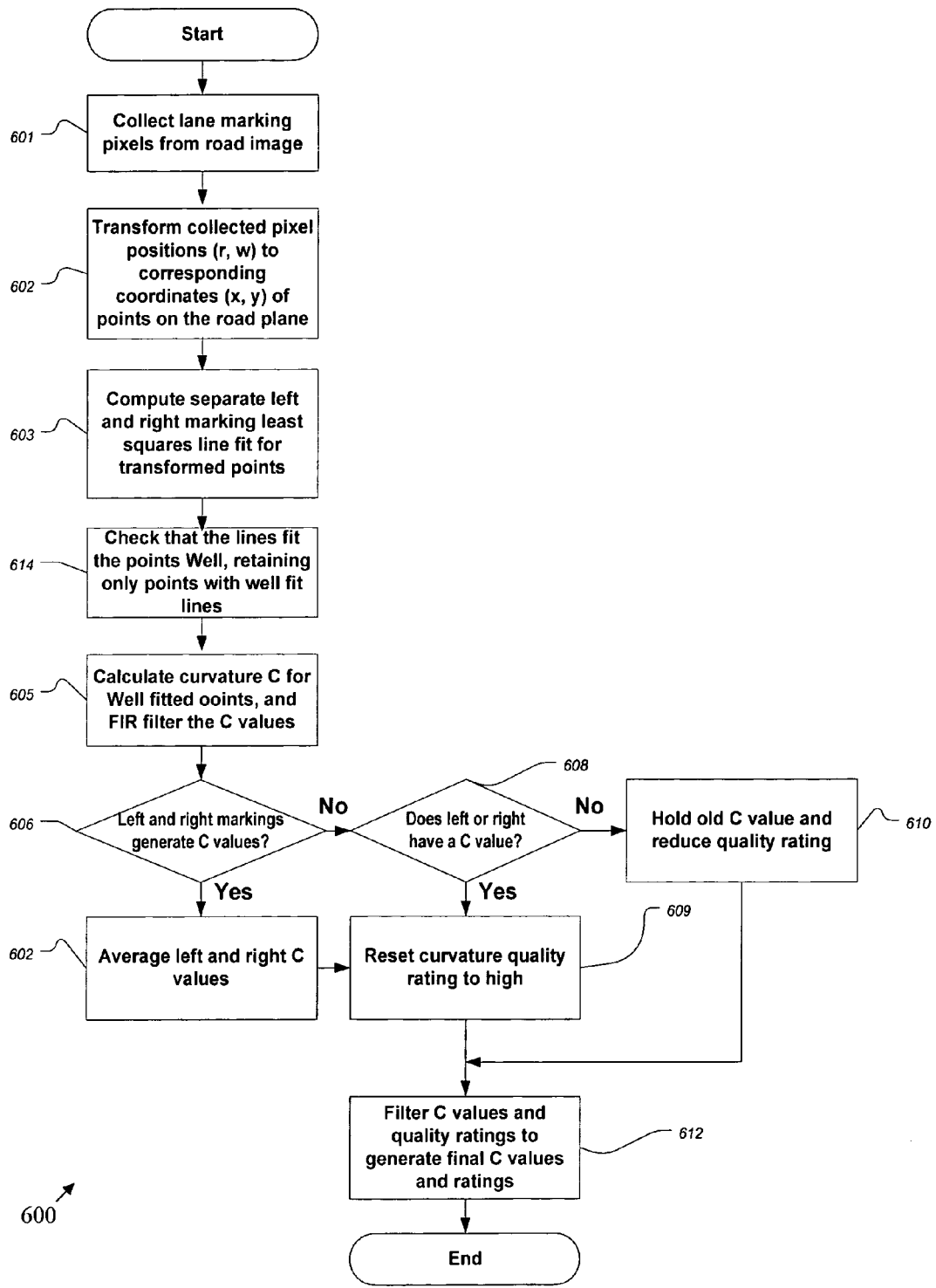
FIG. 9 shows a flowchart of a process for curvature measurement, according to an embodiment of the invention.

FIG. 9 shows a flowchart of the steps of a curvature measurement process 600, summarizing the above procedures, according to the following steps:

Step 601: Collect the (r, w) pixel locations of lane markings from a 2-D camera image frame (e.g., detector 6 from image features 7L and/or 7R in image 3). The lane marking pixels are grouped into left and right sides, depending on which side of the road or lane they come from.

Step 602: Use the geometrical transformation (module 22, FIG. 2), to project the 2-D lane marking image pixel locations (r, w) into road plane point coordinates (x, y).

Step 603: Perform a least-squares linear polynomial fit to at least two of the transformed, now in the road plane, (x, y) points in modules 23 and 24, FIG. 2. A linear fit is performed separately for the left side set of points and the right side set of points. Determine slope of the line fit. Retain the number of points used for the fit, the errors in the fit, and determine the distance between the nearest and furthest points (relative to the camera) used for the fit, and the line fit slope found. If less than two points are found on a side, no line fit is performed.

Step 604: Check reasonableness of the line fit by determining if the linear fit matches the points well. This checking is performed by the fit quality check module 29 individually, for each left and right side set of points, Matching well is judged using multiple criteria described above. A fit on one or both sides may fail any one of these multiple criteria and is then not accepted.

Step 605: Calculate the curvatures C in the curvature calculator 25 as described above using points for each side with a well matching fit, as a function the slope m and the average of the nearest and furthest distances as inputs. As described above, curvature is based on the slope of the line or least-squares line fitting the two or more data points, divided by the average of the nearest and furthest distances to those data points. This relation (curvature=slope/average distance ahead) is applied separately for each side if the fitted line matches the data. Then, FIR filter the result via filter 26.

Step 606: Determine if both the left and right side set of points have curvature values. As checked by the fit quality check module 29, either one or both sides may not pass step 604. Any side that does not pass step 604 does not produce a curvature value. If both sides have produced curvature values, proceed to step 607, else proceed to step 608.

Step 607: Average the left and right side curvature values in averaging module 27. Go to step 609.

Step 608: Determine if only one side has a curvature value, as checked by the quality fit check module 29. If so, go to step 609 else go to step 610.

Step 609: Reset curvature quality to high (e.g., 1.0, by quality measure module 28). Proceed to step 612

Step 610: Hold curvature value and reduce quality value. Go to step 611 (set by module 30, FIG. 2).

Step 611: Filter curvature and quality values to generate output curvature value (performed by module 30, FIG. 2).

The camera roll angle (generally small) may be included in the (r, w) to (x, y) points conversion (i.e., geometrical transformation). The number of points found can range between e.g., 2 and 12, and may be between 2 to 4. The distance between nearest and furthest points can range from e.g., 2 to 50 meters, and may be between 4 to 12 meters. The uncertainty in the slope can range from e.g. 0 to 10, and may be 0.05 to 0.25. The chi-squared for fit can range from 0 to a large number, and may be between 0.02 to 0.1. The magnitude of the slope can range from 0 to a very large number, and may be between 0.2 to 1.0, depending on the imager.

The present invention provides a method and system for video-based road lane curvature measurement. Road curvature is approximated using a relation between: the slope of a line (chord) connecting two points on a lane marking, and the average distance from the camera to the line. The yaw angle of the camera viewing the road is accounted for. Only two points are required to define said to line, the line's slope value and the curvature. The curvature value is filtered with a speed-dependent mechanism, reducing measurement noise, but retaining local detail at different driving speeds.

In an example operation scenario, the detection module 6 finds the points forming the boundaries of the lane or road in the video image, and the curvature measurement module 9 uses this information to measure the road or lane curvature at that, single, video frame. The module 9 uses the boundary points in the image, and determines the corresponding ones in the plane of the road ahead. The individual road-plane set of points are combined with a first-order least-squares or median fit, producing a fit line generally describing the boundaries in the road plane.

The nearest, furthest and average distances to this set of road-plane points, are determined. The difference between the nearest and furthest distances is compared to a threshold to determine it if is large enough to be a marking. The quality of the line fit to the boundary points is checked (via a standard, chi-squared, goodness of fit test, and via the statistical error in the slope of the line, both compared with a threshold). Then it is determined if the absolute slope of the line fit is plausible, checked by a comparison with a threshold. The results of the nearest to furthest distance, chi-squared goodness of fit, slope error, and absolute magnitude of the slope tests, are used to determine whether the line slope signal can be used or not (signal acceptability test). If the signal is acceptable, then the slope the road plane line is divided by the average distance to the set of points, to generate a raw curvature measure. Where the yaw angle of the camera relative to the boundaries or markings is non-zero, it is subtracted from the slope before the curvature calculation, to ensure a yaw-free, raw curvature value.

The module 9 filters the single, frame to frame, yaw-free, curvature signal with a first averaging filter, thus reducing noise. The length of this first averaging filter depends on the vehicle speed. The length is chosen such that at higher speeds, where road is traveled more quickly, the filter length is made shorter and local detail in the (filtered) curvature signal is maintained. The filter length is set to correspond to a fixed travel distance, so that twice the speed uses half the filter length. A minimum and maximum filter length are enforced (a fixed-length filter would remove more and more signal detail as the speed increases.)

The module 9 averages the curvatures of multiple boundaries, when these values are available. The multiple boundaries can be located on different sides of the road or lane or be multiple markings or boundaries on one or both of the road or lane sides. The distance between the markings or boundaries may be accounted for in the curvature calculation (the outside edge of a curve has larger radius than the inside edge). The averaged curvature is then filtered with a second filter whose coefficients depend on the vehicle speed, to obtain a final locally smoothed, yaw-free curvature value, using all available boundaries or markings.

The module 9 then determines the last image frame in which suitable road or lane boundaries were found, and then generates a quality measuring signal reflecting the time elapsed since then. The quality measuring signal is passed through a speed dependent, smoothing filter, producing a final curvature quality signal.

As such, the module 9 may receive input including points belonging to the lane or roadway boundary(-ies) from the video image of a road ahead, along with vehicle speed, camera height, camera pitch angle, camera yaw angle relative to the road or lane boundaries, the lateral location of the straight road vanishing point in the image, the camera (imager) horizontal pixel size, the imager vertical pixel size, the imager vertical optical axis location, and the lens focal length. From such input, the module 9 outputs the road or lane curvature, and a quality measure related to the last time the curvature could be measured.

A number of points (pixels) in the image corresponding to a lane or roadway boundary, are denoted these by their image row and column locations. For a curving road, there is an inner edge (e.g., 8L corresponding to 7L in FIG. 1), and an outer edge (e.g., 8R corresponding to 7R in FIG. 1). Pixels corresponding to to inner edge points and pixels corresponding to outer edge points may not be necessarily the same in number. Using the image points (inner edge points e.g. at rows ri, columns wi; and outer edge points e.g. at rows ro, columns wo), the locations on a presumed flat road ahead that correspond the points in the image, are determined based on the geometrical transformation. The transformation utilizes parameters including the camera height is h, the camera pitch angle α, the camera yaw angle yaw, the imager horizontal pixel size Hp, the imager vertical pixel size Vp, the lens focal length is FL. The image points and parameters are used to determine location on the plane of the road ahead, corresponding to the boundary/marking points in the image, The locations are given by how far ahead, measured on the ground, x they are and the distance to the side y, wherein:

$$x = h/\tan(\alpha + \tan^{-1}(r*Vp/FL)),$$

$$y = Hp*w*(h^2 + x^2)^{1/2}/(FL^2 + n^2*vp^2)^{1/2}.$$

All image row and column locations (r, w) are converted (transformed or re-projected) to the road plane, providing corresponding (x, y) pairs. The inner and outer road boundaries (if two are present) project to different pixel points.

For each set of points associated with a boundary or lane marking, the distance to the nearest and the furthest points are stored. These are the smallest and largest values of x associated with (ri, wi) and (ro, wo). The smaller values of x are for a set of road points nearer the camera (Near points), and the larger values of x are for a set of road points further form the camera (Far points). A line is fit through the (x, y) locations in the plane of the road, separately for each side of the curve. The dependent variable for this fit is y and the independent variable is x. A least-squares or least median-squares fit may be used. The result of this fit is a linear function relating x toy, as:

$$y = \text{slope}*x + \text{intercept}.$$

Associated with this fit, there is (standard) chi-squared goodness of fit and an uncertainty in the slope value. Next step is to check if the data set has produced a satisfactory fit. This is done by determining if:

Far−Near>distance threshold,

Chi-squared<goodness of fit threshold,

Slope uncertainty<slope uncertainty threshold, and

Absolute value of slope<slope magnitude threshold.

If all three above conditions are met, there is an acceptable fit. Based on the acceptable fit, calculate the raw (not yet compensated for yaw), curvature value RC as:

$$RC = \text{slope}/((\text{Near} + \text{Far})/2).$$

Remove the yaw angle of the camera from RC by subtraction to obtain a corrected curvature C as:

$$C = RC - \text{yaw}.$$

Filter the curvature C with a moving average filter whose length depends on the vehicle speed and the video frame rate. For example, the length of the filter can be as:

filter length=(12 meters/vehicle speed in meters per second)* (number of video frames processed per second).

The filter length is set to a lower limit of at least two pixels, and an upper limit, depending on the desired lower bound of the vehicle speed for curvature measurement. Non-integer filter lengths are rounded to the nearest integer. The filter is an equally weighted, moving average filter, whose application generates the average value of the raw curvature for that filter length. This moving average filter takes a filter length long set of yaw-free curvature values, starting with the most recent yaw-free curvature, and proceeds backward in time (to one frame earlier, two frames earlier, . . . and so on) until filter length samples have been accumulated, adding these yaw-free curvature values together, and then divides by the filter length. The result is a locally averaged, yaw-free, curvature value.

If there are two boundaries (7L, 7R a lane width distance Q between them is used, with the inside (e.g., left marking 7L) boundary producing a measured curvature Ci and the outside boundary (e.g., right marking 7R) producing a curvature measured Co, the process determines indicated curvature of the outer edge indicates at the inside curve inside, as:

curvature inside=$Co/(1-Co*Q)$.

Adding Ci (the truly measured curvature from the inside) with the curvature found from the curve outside:

Averaged inside and outside curvatures=$(Ci+(Co/(1-Co*Q)))/2$.

This provides a combined, better measurement for the inside radius of the curve, because multiple point sets are used. Alternatively, the curvatures Ci and Co can be added and divide by two, giving the curvature at the road or lane lateral center.

The averaged curvature is smoothed with a low-pass filter. The low-pass filter has a length corresponding to the 12 meters used above, or can be an infinite impulse response filter with the same 50% decay time as the 12 meter long filter. The result is the final, yaw-free curvature value.

A signal is generated reflecting the quality of the final, yaw-free curvature value. Every frame with markings or boundaries (whose corresponding point sets (r, w)) that produces an acceptable curvature value has a quality of one. Frames without acceptable curvature values cause this quality to lower linearly, so the quality may drop, for example, from 1.0 to 0.9. We denote the drop per frame by curvature quality decay rate DR (0.1 in said example). If the next frame again produces no acceptable curvature value, then the quality then drops to 0.8 (for example). The result is the raw curvature quality value either at 1.0, or dropping linearly from 1.0, but constrained to a minimum of 0.0, wherein raw curvature quality CQ can be as:

$CQ$=maximum of $(1.0 - DR*NCF, 0.0)$, wherein NCF is the number of consecutive frames without an acceptable curvature value. The CQ is smoothed with a low-pass filter, providing a smoothed, curvature quality value.

As is known to those skilled in the art, the aforementioned example architectures described above, according to the present invention, can be implemented in many ways, such as program instructions for execution by a processor, as logic circuits, as an application specific integrated circuit, as firmware, as software modules, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of determining curvature of a road, comprising the steps of:
receiving at an image processing system an image of a road in front of a vehicle from an imager;
identifying at least two points in the image representing road boundary indicators;
projecting each point to a corresponding location on the road plane;
determining a line fit for the at least two locations;
determining the slope of the line fit; and
approximating the road curvature based on the slope of the line fit and the average longitudinal distance from the imager to the line fit.

2. The method of claim 1 wherein:
the image comprises a two dimensional may of points arranged in rows and columns; and
projecting each point to a location on the road plane includes determining coordinates for said location on the road plane, said coordinates comprising lateral offset and distance ahead, relative to the imager.

3. The method of claim 2 wherein determining the line fit further includes performing a least-squares linear polynomial fit to the at least two locations.

4. The method of claim 3 further including checking quality of the line fit by determining if the linear fit matches the locations well.

5. The method of claim 4 wherein determining quality of the line fit includes:
checking if the chi-squared statistic for the fit line is below a certain threshold;
checking if the uncertainty in the fit line slope is below an error threshold;
wherein the quality of the line fit is acceptable if the chi-squared is below a chi threshold and fit line slope is below an error threshold.

6. The method of claim 4 wherein approximating the road curvature includes approximating the road curvature value based on a ratio of the slope of the line fit and the average longitudinal distance from the imager to the line fit.

7. The method of claim 6 wherein approximating the road curvature further includes:
determining the average longitudinal distance from the imager to the line fit by obtaining the average distance between the nearest and furthest locations relative to the imager; and
wherein checking quality of the line fit as acceptable, further includes checking absolute magnitude of the slope for plausibility, and checking that the distance between the nearest and furthest point exceeds a certain threshold.

8. The method of claim 6 further including filtering the curvature value using a speed-dependent mechanism, reducing measurement noise, and retaining local detail at different driving speeds.

9. The method of claim 6 further including the step of subtracting the imager yaw angle from the curvature value to account for imager yaw angle relative to the road ahead.

10. The method of claim 6 further including the steps of:
approximating a curvature value for each boundary of the road; and
averaging the curvature values, to generate a final curvature value.

11. The method of claim 6 further including the step of determining a curvature quality measure for the frame based on the last road image for which acceptable fit line quality was obtained.

12. The method of claim 6 further including correcting the curvature value for a roll angle of the imager relative to the road.

13. An apparatus for determining curvature of a road, comprising:
a transformation module configured for, receiving locations of at least two points in an image of a road in front of a vehicle, representing road boundary indicators, and projecting each point to a corresponding location on the road plane,
a curve fit component configured for determining a approximate line fit for the at least two locations, and determining the slope of the line fit; and
a curvature determination module configured for approximating the road curvature based on the slope of the line fit and the average longitudinal distance from an imager used to obtain said road image, to the line fit.

14. The apparatus of claim 13 wherein:
the image comprises a two dimensional array of points arranged in rows and columns; and
the transformation module is configured for projecting each point to a location on the road plane includes determining coordinates for said location on the road plane, said coordinates comprising lateral offset and distance ahead, relative to the imager.

15. The apparatus of claim 14 wherein the curve fit component is farther configured for performing a least-squares linear polynomial fit to the at least two locations for determining said approximate line fit.

16. The apparatus of claim 15 further including checking a fit quality module configured for checking quality of the line fit by determining if the linear fit matches the locations well.

17. The apparatus of claim 16 wherein the fit quality module is further configured for determining quality of the line by:
checking if the chi-squared statistic for the fit line is below a certain threshold;
checking if the uncertainty in the fit line slope is below an error threshold;
wherein the quality of the line fit is acceptable if the chi-squared is below a chi threshold and fit line slope is below an error threshold.

18. The apparatus of claim 16 wherein the curvature determination module is further configured for approximating the road curvature based. on a ratio of the slope of the line fit and the average longitudinal distance from the imager to the line fit.

19. The apparatus of claim 18 wherein the curvature determination module is further configured for approximating the road curvature by determining the average longitudinal distance from the imager to the line fit by obtaining the average distance between the nearest and furthest locations relative to the imager.

20. The apparatus of claim 18 further including a filtering module configured for filtering the curvature value using a speed-dependent mechanism, reducing measurement noise, and retaining local detail at different driving speeds.

21. The apparatus of claim 18 wherein the curvature determination module is further for subtracting a yaw angle of the imager from the curvature value to account for imager yaw angle relative to the road ahead.

22. The apparatus of claim 18 wherein the curvature determination module is further for approximating a curvature value for each boundary of the road, and averaging the curvature values to generate a final curvature value.

23. The apparatus of claim 18 further a curvature quality module configured for determining a curvature quality measure for the frame based on the last road image for which acceptable fit line quality was obtained.

24. The apparatus of claim 18 wherein the curvature determination module further including correcting the curvature value for a roll angle of the imager relative to the road.

25. A system for determining curvature of a road, comprising:

a boundary detector configured for receiving an image of a road in front of a vehicle from an imager, and identifying at least two points in the image representing road boundary indicators;

a transformation module configured for projecting each point to a corresponding location on the road plane;

a curve fit component configured for determining a approximate line fit for the at least two locations, and determining the slope of the line fit; and a curvature determination module configured for approximating the road curvature based on the slope of the line fit and the average longitudinal distance from the imager to the line fit.

* * * * *